S. C. HAWKINS.
Car Truck.

No. 50,472.

Patented Oct. 17, 1865.

Witnesses.

Inventor.
S C Hawkins

UNITED STATES PATENT OFFICE.

SAMUEL C. HAWKINS, OF PATCHOGUE, NEW YORK.

IMPROVEMENT IN RAILWAY-CARS.

Specification forming part of Letters Patent No. 50,472, dated October 17, 1865.

*To all whom it may concern:*

Be it known that I, SAMUEL C. HAWKINS, of Patchogue, in the county of Suffolk and State of New York, have invented a new and useful Improvement in Railroad-Cars; and I do hereby declare that the following is a full, clear, and exact description thereof, which will enable those skilled in the art to make and use the same.

The present invention consists in using, in connection with the ordinary wheels of a railroad-car, a series of one or more inclined or oblique wheels, arranged and connected either with the frame or truck of the car in such a manner as to bear upon and against the inner sides of the rails, whereby the flanges of the upright wheels are prevented from coming in contact with the sides of the rails, thus relieving not only the rails, but also the wheel-flanges from a great deal of wear. These oblique wheels are also so arranged that their pressure upon the rails increases in direct proportion to the tendency of the ordinary wheels to come in contact by their flanges with the rails, thus continually acting to throw them out of contact and securing the objects hereinbefore stated.

In addition to the above, by this improved arrangement of the wheels of cars, the frequent and almost continual oscillation of the car from side to side, as it is drawn over the rails with any degree of speed, is entirely obviated, the motion of the car being made easy and pleasant to those riding in it, and the liability of the car to run off of the track much lessened, as well as many other important advantages, as will appear from the following detail description of my improvements, reference being had to the accompanying plate of drawings, of which—

Figure 1:
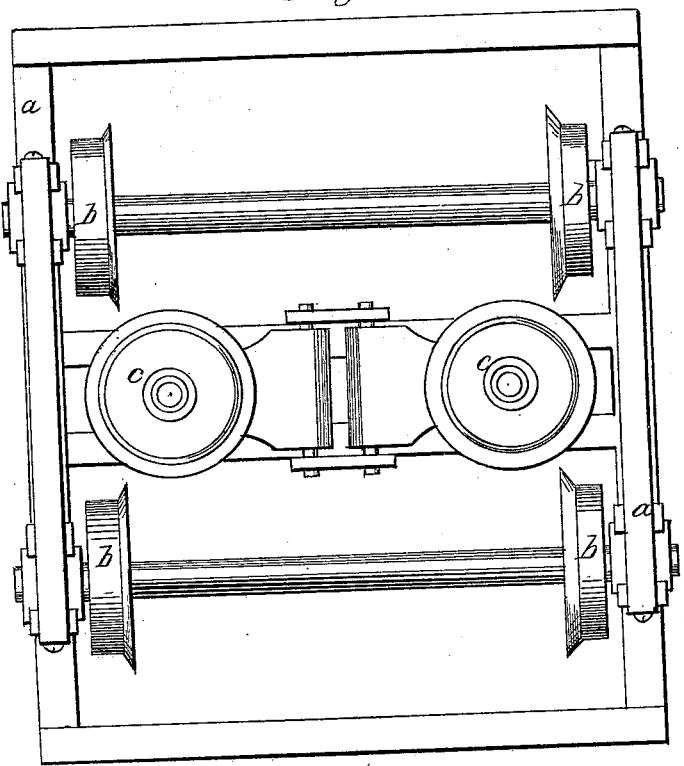
Figure 2:
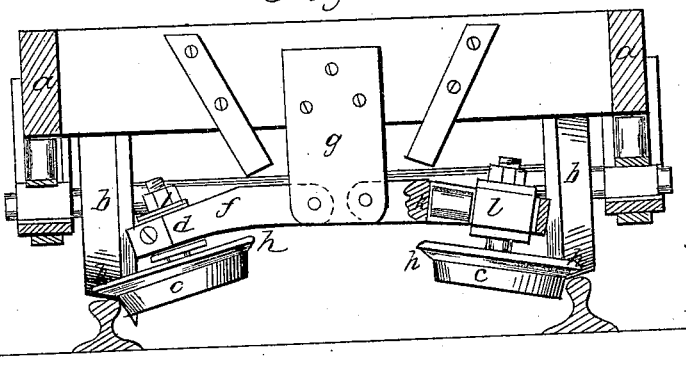

Figure 1 is a plan view of a railroad-car truck, from its under side, with my oblique wheels arranged thereon and in connection therewith; and Fig. 2, a cross-section of the car-truck and rails, showing the arrangement of the oblique wheels partially in side view and vertical section.

*a a* in the drawings represent a railroad-car truck, made in any of the ordinary modes, and having a series of car-wheels, *b b b b*, four in number, placed in a vertical position, two upon each side of the truck, and arranged in every respect substantially similar to those now in use.

In addition to the wheels *b*, and upon the same truck, are two supplementary or additional wheels, *c c*, hung and turning in the outer ends, *d d*, of swinging arms *f f* of a fixed center standard or post, *g*, of the truck, which arms extend in opposite directions from the fixed post *g*, and are of sufficient length that when the truck is placed upon the rails their wheels will bear against the inner sides of the rails, the flanges *h h* thereof resting upon the top surface of the same, as plainly seen in Fig. 2, the supplementary wheels being, as is obvious, thus in an inclined or oblique position as regards the vertical wheels *b*.

The swinging arms *f f*, in which the supplementary wheels are hung, may be suspended at their outer ends from the bottom of the car by means of chains or other suitable devices, so as to prevent them from falling too far, thus always holding them at the proper height to engage with the rails, as explained, in case the truck should become detached from the rails.

By using the supplementary wheels, arranged as described with regard to the ordinary wheels of railroad-cars, it is apparent that the flanges of such wheels can be prevented from coming in contact with the sides of the rails by properly adjusting the oblique or supplementary wheels therefor, and thus a great deal of their wear, as well, also, as that of the rails, prevented; and, furthermore, by the use of these extra wheels the violent vibrating or oscillating motion of the cars from side to side, as now occurs, is in a great measure obviated, the importance and advantages of which are obvious, the shafts of the supplementary wheels turning in yielding bearings *l l* of the swinging arms. By thus arranging the bearings of the supplementary wheels the wheels, as is manifest, can yield or adapt themselves to whatever inequalities there may be in the rails or in the jointing of the same, the swinging arms in which they are hung allowing a vertical play to them.

In lieu of arranging the oblique wheels upon the car-truck, they can be applied directly to the car; but I do not deem it advisable or practical, and, also, more than one set can be employed, if desired, and either one or more in a set, and therefore I do not intend to limit myself to any particular place or point of application or to any number to be used.

I am aware that oblique wheels have before been applied to railway-cars, but only, so far as my knowledge extends, to railways having wooden rails; but in such case a fixed framework in which the oblique wheels were hung was used, which, it is perfectly apparent, was wholly impracticable, and, besides, the wheels could not yield to any irregularities in the laying of the rails or their formation, whether in a vertical or lateral direction, whereas by my invention a perfect adjustment of the wheels to the character of the track is obtained.

In addition to the many important results obtained by the present improvements to those hereinbefore mentioned, it may be well here to remark, in conclusion, that the supplementary wheels have a tendency to throw from the track any obstacles which may be on it, and besides serving to bring the upright wheels back to their proper position upon the rails in case they should run over any thing, and thus be lifted or disconnected from the rails; and, furthermore, the arch-shape of the arms in which the oblique wheels are hung imparts great strength to them, and as they press directly against the inside of the rails the flanges of the upright wheels are thus relieved from strain, which oftentimes now causes their breakage, rendering them useless.

I claim as new and desire to secure by Letters Patent—

In combination with the ordinary wheels of a railway-car the use of one or more sets or series of supplementary or oblique wheels, hung and turning in suitable swinging arms or frames arranged with regard to the rails, and operating substantially in the manner described, and for the purposes specified.

SAML. C. HAWKINS.

Witnesses:
WILLIAM BUDDS,
CHAS. H. GERARD.